Oct. 10, 1961 R. W. WILSON 3,003,460
MAGNETIC CONVEYOR
Filed Dec. 9, 1957 2 Sheets-Sheet 1
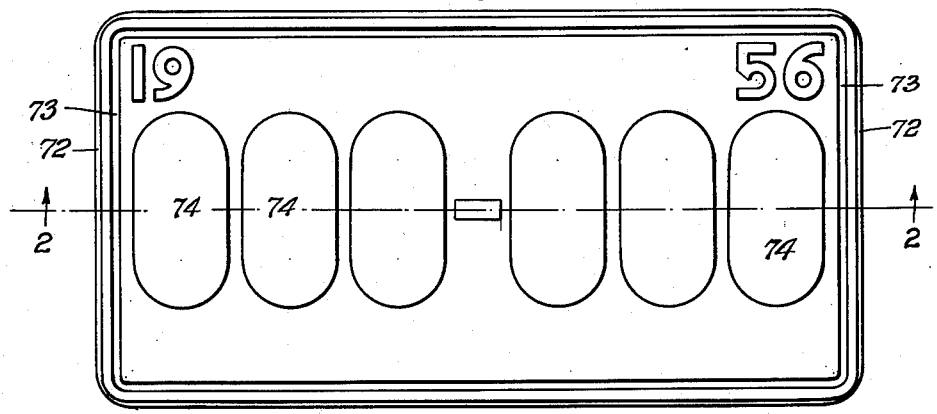
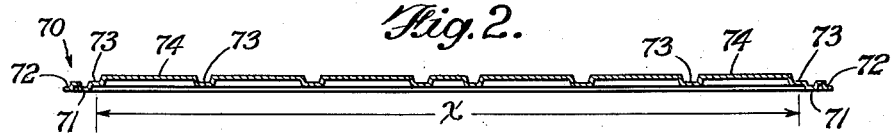
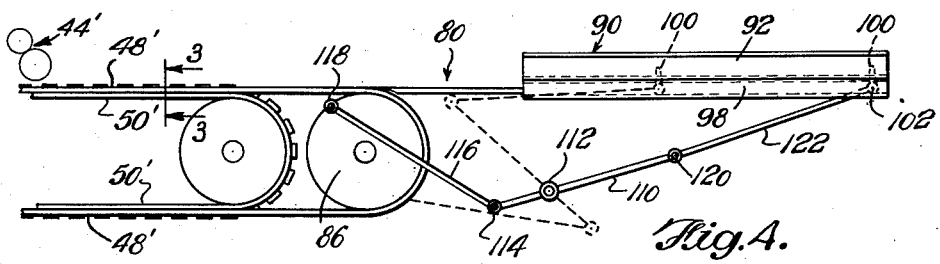
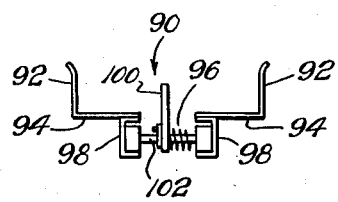
INVENTOR
Rufus W. Wilson, Jr.
BY Karl W. Flocks
ATTORNEY Oct. 10, 1961 R. W. WILSON 3,003,460
MAGNETIC CONVEYOR
Filed Dec. 9, 1957 2 Sheets-Sheet 2
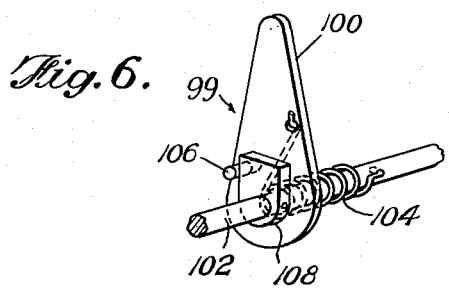
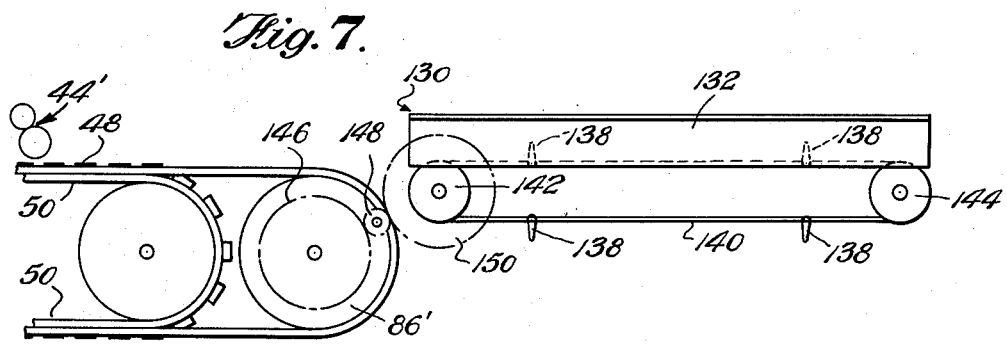
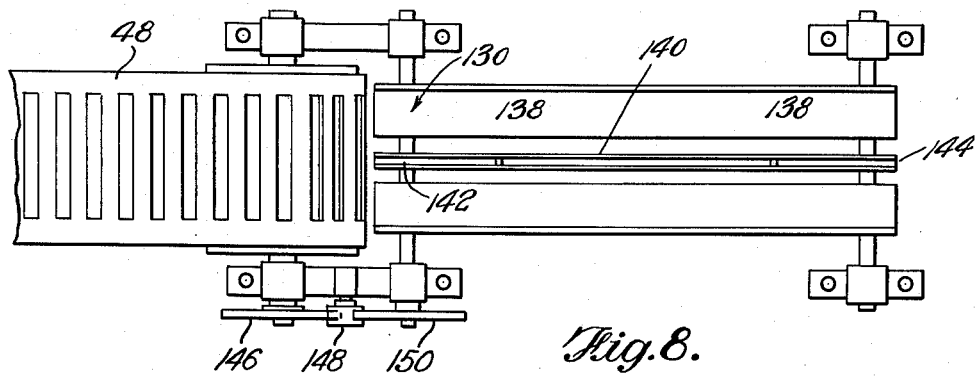
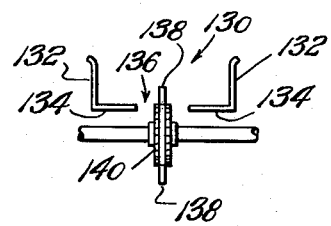
INVENTOR
Rufus W. Wilson,
BY Karl W. Flocks
ATTORNEY

United States Patent Office 3,003,460
Patented Oct. 10, 1961

3,003,460
MAGNETIC CONVEYOR
Rufus W. Wilson, Huntingdon, Pa., assignor to Wald Industries, Inc., Huntingdon, Pa., a corporation of Pennsylvania
Filed Dec. 9, 1957, Ser. No. 701,450
1 Claim. (Cl. 118—236)

This invention relates to coating apparatus and more particularly to a coating apparatus comprising a magnetic conveyor for supporting and moving ferro-magnetic objects past a coating device.

This application is a continuation-in-part of my copending application Serial No. 687,678 entitled "Magnetic Conveyor," filed October 2, 1957 now Patent No. 2,873,843, issue of February 17, 1959.

In the above identified patent, there is disclosed a conveyor assembly which comprises two endless conveyor members, arranged so that there is an outer conveyor member, and an inner conveyor member mounted for movement in a path inwardly of and adjacent the outer conveyor member. The outer conveyor member has a plurality of apertures, and the inner conveyor member has a plurality of magnets which engage with these apertures.

The magnetic conveyor of the invention is particularly adapted for conveying ferromagnetic license plates or road signs past a coating or painting apparatus. However, a particular problem arises when the license plates carried by the magnetic conveyor are of the type having a reverse bead border in which the outer rim or border of the license plate is embossed or "debossed" in an opposite direction to the direction of the embossing of the serial number or other indicia on the license plate. The reverse bead border license plate has a cross-section which lies in three different planes, with the result that the magnetic pull on the license plates by the magnetic conveyor tends to cause a deflection of the center section of the plate so that the serial numbers on the plate do not properly contact the coating rolls. A modified embodiment of the magnetic conveyor is particularly adapted to overcome the problem just described in connection with reverse bead border license plates.

Accordingly, an object of the invention is to provide a coating apparatus comprising a magnetic conveyor particularly suitable for conveying license plates, and more particularly license plates of the reverse bead border type, past a coating device used in connection with the manufacture of license plates.

Still another object of the invention is to provide a coating apparatus comprising a magnetic conveyor for conveying license plates of the reverse bead border type combined with a dispensing device for dispensing license plates to the conveyor in synchronism with the movement of the conveyor to thereby insure proper location of the license plates with respect to the magnet members of the conveyor.

In achievement of these objectives, there is provided in accordance with an embodiment of this invention a magnetic conveyor including an outer material-carrying conveyor of non-magnetic material having a plurality of apertures through the surface thereof, and an inner conveyor mounted for movement adjacent the inner surface of the outer conveyor and having positioned thereon a plurality of permanent magnets which pass through the apertures of the outer conveyor into direct magnetic contact with ferromagnetic objects carried by the outer conveyor. An important advantage of the conveyor construction is that the engagement of the magnets of one conveyor with the apertures of the other conveyor provides a direct mechanical driving relation between the inner and outer conveyors.

An embodiment of the invention particularly adapted for conveying license plates of the reverse bead border type includes rectangular-shaped magnetic members having a dimension which lies within the reverse bead border of the license plate in such manner as to support the center section of the plate between the oppositely disposed reverse beads along oppositely disposed edges of the license plate. Since it is important that the reverse bead border along the leading and trailing edges of the license plate lie between successive permanent magnets, or, in other words, that the magnets lie entirely within the rectangular border defined by the entire periphery of the reverse bead, a dispensing mechanism is provided which dispenses the license plates to the magnetic conveyor in synchronization with the movement of the conveyor to insure proper location of the reverse bead border license plates with respect to the magnets on the conveyor.

Other objects and the nature and advantages of the instant invention will be apparent from the following description taken in conjunction with the accompanying drawings, wherein:

FIG. 1 is a top plan view of a license plate having a reverse bead border;

FIG. 2 is a view in transverse cross-section of the reverse bead border license plate along line 2—2 of FIG. 1;

FIG. 3 is a view in transverse section of the inner or magnetic conveyor for receiving reverse bead border license plates taken substantially along line 3—3 of FIG. 4;

FIG. 4 is a side elevational view, partially broken away, showing a dispensing apparatus for dispensing license plates to the magnetic conveyor in synchronism with movement of the conveyor;

FIG. 5 is an end view of the dispensing apparatus of FIG. 4 showing the trough for holding the license plates and the pusher finger which ejects license plates from the trough;

FIG. 6 is an enlarged detail view of the pusher finger of the dispensing apparatus;

FIG. 7 is a side elevational view, partially broken away, showing a modified dispensing apparatus for dispensing license plates to the magnetic conveyor in synchronism with movement of the conveyor;

FIG. 8 is a top plan view of the dispensing apparatus of FIG. 7; and

FIG. 9 is an end view of the dispensing apparatus of FIG. 7.

When the magnetic conveyor disclosed in Patent No. 2,873,843 is used to convey ferromagnetic license plates to a coating apparatus or other apparatus used in connection with the manufacture of the license plates, a special problem arises when the license plates are of the type having a reverse bead border. The license plate generally indicated at 70 in FIGS. 1 and 2 is of the reverse bead border type. Plate 70 includes a reverse bead border 71 which, together with peripheral rim 72, lies in a plane below the main body surface 73 of the license plate. The embossed indicia 74, including the serial number and state name, lie in a plane which is above the plane of the main body surface 73 of the plate. Thus, a license plate of the reverse bead border type includes three planes in transverse cross section, as follows: (1) The plane of reverse bead border 71 and peripheral rim 72 which lies below the plane of the main body surface of the license plate; (2) The main body surface 73 of the license plate; and (3) The plane of the embossed indicia 74, including the serial number of the license plate and the state name, which lies above the plane of the main body surface of the license plate. It will be understood that the plates are positioned on the conveyor with plane 74 of the indicia uppermost and with plane 71 of the reverse bead border lowermost.

When a license plate of the reverse bead border type is carried on a magnetic conveyor, there is a tendency for the magnetic pull on the license plate to cause the central portion of the license plate lying between the oppositely disposed reverse beads 71 to sag. As a result of this sagging, the central portion of the transverse dimension of the license plate containing the serial number does not properly contact the coating rolls and therefore is not properly coated. In order to overcome this problem in conveying license plates of the reverse bead type, I employ rectangular-shaped bar magnets 54' which extend transversely of the direction of movement of the conveyor and are spaced apart lengthwise of the conveyor. Rectangular magnets 54' are suitably secured by screws 55 to the upper surface of conveyor belt 50'. Conveyor belt 50' is disposed within outer conveyor belt 48' having rectangular-shaped apertures through which magnets 54' extend in such manner that the upper or outer surface of each magnet 54' is spaced a short distance outwardly of the outer surface of apertured conveyor 48'. A roller coating apparatus, schematically illustrated and designated 44' overlies conveyor belt 48'.

Each magnet 54' has a length transverse of the direction of movement of the conveyor which is so dimensioned as to fit between the oppositely disposed reverse beads 71 of the license plate. As best seen in FIG. 2, the dimension "X" between the two oppositely disposed reverse beads 71 along the two oppositely disposed edges of the license plate which extend in the direction of conveyor movement is slightly greater than the dimension of the rectangular-shaped magnets 54' in a direction transverse of the longitudinal movement of the conveyor. Also, the distance that magnet 54' extends above belt 48' is about at least as great as the distance between the main body surface 73 of the license plate reverse bead 71 thereof. Thus, the main body surface 73 of the license plate lies directly on the upper surface of the magnet while the reverse bead 71 and peripheral rim 72 of the license plate lie outside the magnet 54'. The body of the license plate is thereby firmly supported by the plurality of magnets 54' lying beneath the license plate in spaced relating to each other lengthwise of the conveyor between the reverse beads adjacent the leading and trailing edges of the license plate.

It is important that the license plates having reverse bead borders be properly registered with the rectangular magnets 54' in such manner that the reverse bead border along the leading and trailing end edges of the license plates lie between successive permanent magnets rather than on top of a magnet. For this purpose, there is provided a feed mechanism generally indicated at 80 in FIG. 4 which feeds license plates in synchronized relation to the movement of the magnetic conveyor in such manner as to obtain the required registration between the license plates and the rectangular magnets on the conveyor.

As seen in FIG. 4, feed mechanism 80 includes a guide trough 90 for guiding the license plates in aligned relation preparatory to feeding, the trough being positioned in longitudinal alignment with conveyor belts 48 and 50. The plates are placed singly in the trough with plane 74 of the indicia on the respective plates uppermost and with plane 71 of the reverse bead border lowermost.

As best seen in the end view of FIG. 5, trough 90 includes oppositely disposed longitudinally extending side walls 92 and a bottom wall 94 provided with a centrally positioned longitudinally extending slot 96. A pair of channel-shaped track members 98 are rigidly secured to the underneath surface of bottom wall 94 on either side of slot 96 to serve as guides for a slidably movable pusher member generally indicated at 99 and shown in detail in FIG. 6. Pusher member 99 includes a finger member 100 mounted for pivotal movement on a shaft 102 which is guided for sliding movement along channel-shaped guides 98. Finger 100 is biased by a torsion spring 104 into the vertical position shown in FIG. 6, in which a pin 106 carried by finger 100 engages a stop member 108 welded or otherwise rigidly secured to shaft 102.

Finger 100 is successively reciprocated in a forward and reverse direction along trough 90 in synchronism with the movement of the magnetic conveyor 50 by a linkage system which will now be described. A lever member 110 is mounted for pivotal movement about a fixed pivot point 112 below the forward end of trough 90. One end of lever 110 is pivotally connected at point 114 to a crank arm 116 whose opposite end 118 is connected to an eccentric point on pulley 86 of magnetic conveyor 48'. Alternatively, a crank arm may be mounted on the shaft of pulley 86 with crank 116 being pivotally connected to a radially outer point of the crank arm. The end of lever 110 opposite its connection to crank arm 116 is pivotally connected at point 120 to a pusher rod 122 which in turn is pivotally connected to shaft 102 which carries pusher finger 100.

It will be seen that as pulley wheel 86 rotates, crank member 116 swings lever 110 about its fixed pivot at point 112 in such manner as to move push rod 122 backwardly and forwardly to thereby reciprocate pusher finger 100 forwardly and backwardly in timed relation to the movement of the magnetic conveyor. When pusher finger 100 begins its forward or feeding stroke from right to left with respect to the view shown in FIG. 4, finger 100 is in its vertical position under the influence of torsion spring 104 and engages the license plate positioned in trough 90. In its feeding movement from right to left, pusher finger 100 moves the license plate until it is finally ejected from the trough onto the conveyor. When pusher finger 100 has completed its feeding stroke and begins its return stroke from left-to-right with respect to the view shown in FIG. 4, finger 100 abuts against the license plate in trough 90 and moves pivotally about its connection to shaft 102 against the force of torsion spring 104 until it reaches a substantially horizontal position which permits finger 100 to slide beneath the license plate on its reverse stroke. When finger 100 has completed its reverse stroke and has cleared the license plate at the right-hand end of the trough with respect to the view shown in FIG. 4, spring 104 causes finger 100 to move to vertical position again ready for the forward or feeding stroke of the mechanism.

In the modified dispensing arrangement shown in FIGS. 7-9, inclusive, a trough 130 having side walls 132 and a bottom wall 134 is positioned adjacent and in longitudinal alignment with magnetic conveyor 50. Bottom wall 134 of trough 130 has a longitudinal slot 136 to receive continuously moving pusher fingers 138 carried by a chain 140. Chain 140 passes around a drive sprocket 142 at one end and around an idler pulley 144 at its opposite end. Drive sprocket 142 is driven in timed relation to the movement of the magnetic conveyor by a gear train including a gear 146 mounted on the same shaft as pulley 86' of the conveyor, intermediate gear 148, and gear 150 which is mounted on the same shaft as drive sprocket 144. The continuously moving pusher fingers 138 successively feed license plates to the magnetic conveyor in properly timed relation to the movement of the conveyor to obtain proper registration of the reverse bead license plates with the magnets on the conveyor.

It will be seen that the magnetic conveyor and license plate feed mechanism shown in FIGS. 3-9, inclusive, have particular utility in connection with the conveying of ferromagnetic license plates of the reverse bead border type. The magnets of this conveyor are so constructed as to provide a firm support for the reverse bead border license plates in the region of the plate lying between the oppositely disposed reverse bead borders, thereby preventing deflection of the license plates and insuring that the plates properly contact the coating apparatus. Furthermore, the dispensing mechanism in either of its embodiments cooperates with the conveyor to insure that the license plates are fed to the conveyor in such manner as to obtain proper registration of the reverse bead border license plates with the magnets on the conveyor.

It will be obvious to those skilled in the art that various changes may be made without departing from the spirit of the invention and therefore the invention is not limited to what is shown in the drawings or described in the specification, but only as indicated in the appended claim.

What is claimed is:

Apparatus for applying a coating to the indicia of ferromagnetic license plates or the like of the type having reverse beads along the opposite edges thereof lying in a plane below the main body surface of the plate and embossed indicia lying in a plane above the main body surface of the plate, including a first endless conveyor member, a second endless conveyor member having a run extending substantially parallel to, inwardly of, and adjacent a run of said first conveyor member, said first conveyor member having a plurality of apertures therein, a plurality of rectangular magnet members attached to said second conveyor member and passing through said apertures of said first conveyor member to project beyond the surface of said first conveyor member, said magnet members each having a length transverse of the direction of conveyor travel slightly less than the spacing between the reverse beads along opposite edges of the license plate, means for feeding license plates to said conveyor member in synchronized relation to the movement of said conveyor member to cause the leading and trailing edges of the respective license plates to respectively lie between successive magnet members, roller coating means for applying a coating to the indicia of said plates, said roller coating means overlying said conveyor members and positioned to engage said plate indicia whereby said magnets lie between the oppositely disposed reverse beads and directly underlie the main body surface of the license plate to support the main body surface and maintain the indicia in contact with said roller coating means.

References Cited in the file of this patent

UNITED STATES PATENTS

| | | |
|---|---|---|
| 725,630 | Smith | Apr. 14, 1903 |
| 740,604 | Strutz | Oct. 6, 1903 |
| 1,175,578 | Adams | Mar. 14, 1916 |
| 1,238,561 | Ohl | Aug. 28, 1917 |
| 1,375,126 | Willwerscheid | Apr. 19, 1921 |
| 1,385,492 | Prichard | July 26, 1921 |
| 2,333,285 | Wellnitz | Nov. 2, 1943 |
| 2,708,022 | Pettigrew | May 10, 1955 |
| 2,873,843 | Wilson | Feb. 17, 1959 |